(12) United States Patent
Wang et al.

(10) Patent No.: US 7,640,520 B2
(45) Date of Patent: Dec. 29, 2009

(54) DESIGN FLOW FOR SHRINKING CIRCUITS HAVING NON-SHRINKABLE IP LAYOUT

(75) Inventors: Chung-Hsing Wang, Baoshan Township (TW); Lee-Chung Lu, Taipei (TW); Cliff Hou, Taipei (TW); Lie-Szu Juang, Saratoga, CA (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 211 days.

(21) Appl. No.: 11/807,640

(22) Filed: May 30, 2007

(65) Prior Publication Data
US 2008/0229259 A1 Sep. 18, 2008

Related U.S. Application Data

(60) Provisional application No. 60/906,794, filed on Mar. 13, 2007.

(51) Int. Cl.
*G06F 17/50* (2006.01)

(52) U.S. Cl. .................. 716/2; 716/1; 716/3; 716/7; 716/8; 716/9; 716/10; 716/11

(58) Field of Classification Search .............. 716/1–3, 716/7–15
See application file for complete search history.

(56) References Cited

U.S. PATENT DOCUMENTS 5,477,467 A * 12/1995 Rugg ..................... 716/17
5,493,510 A * 2/1996 Shikata .................. 716/9

\* cited by examiner

*Primary Examiner*—Thuan Do
*Assistant Examiner*—Nghia M Doan
(74) *Attorney, Agent, or Firm*—Slater & Matsil, L.L.P.

(57) ABSTRACT

A method for processing an integrated circuit is provided. The method includes providing a first integrated circuit having a first scale, wherein the first integrated circuit comprises a shrinkable circuit comprising a first intellectual property (IP) layout, and a non-shrinkable circuit comprising a second IP layout; and generating a second integrated circuit having a second scale smaller than the first scale. The step of generating the second integrated circuit includes shrinking the shrinkable integrated circuit to the second scale. The method further includes merging the second IP layout with the non-shrinkable circuit to generate a final integrated circuit.

17 Claims, 4 Drawing Sheets

DESIGN FLOW FOR SHRINKING CIRCUITS HAVING NON-SHRINKABLE IP LAYOUT

This application claims the benefit of U.S. Provisional Application Ser. No. 60/906,794, filed on Mar. 13, 2007, entitled "Shrink Design Flow with Don't Touch Critical (or Legacy) IP Layout," which application is hereby incorporated herein by reference.

TECHNICAL FIELD

This invention relates generally to the manufacture of integrated circuits, and more particularly to the shrinking of integrated circuits between different technology generations.

BACKGROUND

In order to incorporate more functions and achieve better performance and less cost, integrated circuits are formed with increasingly smaller dimensions. However, there are legacy circuits that have already been designed with greater dimensions. It is not cost effective to redesign these circuits for smaller dimensions, and these circuits were typically shrunk before they are implemented on silicon wafers. Conventionally, foundries performed the task of shrinking integrated circuits.

Since the performances of integrated circuits are often related to their sizes, some integrated circuits are preferably not shrunk. For example, analog circuits and some high-speed integrated circuits need to keep their original sizes in order to maintain their performance unchanged throughout different generations of integrated circuits. This creates a dilemma. Since these non-shrinkable integrated circuits are often integrated in the same semiconductor chips with shrinkable integrated circuits, whose performances are not affected by their dimensions, the integrated circuits for a semiconductor chip cannot be uniformly shrunk, and efforts are needed to shrink only the shrinkable circuits, while keeping the non-shrinkable circuits intact.

To achieve this goal, typically, the graphic data system (GDS or GDSII format) layout of the non-shrinkable circuits was blown up (magnified) first. An abstract is then generated from the blown-up GDS layout of the non-shrinkable circuits. The blown-up GDS layout and the respective abstract are then merged with the GDS layout and the abstract of shrinkable circuit layouts to generate a new integrated circuit. Foundries can then shrink the new integrated circuit to substantially a same scale as the GDS layout of the non-shrinkable circuit was magnified. Accordingly, the GDS layout of the non-shrinkable circuits is restored back to the original size, while the shrinkable circuits are shrunk.

The conventional methods for shrinking integrated circuits suffer drawbacks, however. First, even if the non-shrinkable circuits are magnified and then shrunk in a same scale, the resulting dimensions and locations of the final circuits may not be exactly the same as in the original design. This is due to the snapping of integrated circuits to grids, which causes the change in the size and/or location of integrated circuit components. The change in dimensions may cause performance drift. Second, GDS files are typically hierarchical with a plurality of levels. In order to avoid the adverse generation of broken lines caused by snapping, the hierarchy of GDS files needs to be flattened into a same level, resulting in a big GDS file. This causes the handling time to be longer. Third, the adverse change in the dimensions of integrated circuits due to the snapping causes device mismatching. For matching devices, even though they have exactly the same dimensions as that of before the shrinking process, but since they are at different locations, after shrinking, they may have different sizes. Therefore, the performance matching is broken.

What is needed in the art, therefore, are new methods for shrinking integrated circuits without causing the above-discussed problems.

SUMMARY OF THE INVENTION

In accordance with one aspect of the present invention, a method for processing an integrated circuit is provided. The method includes providing a first integrated circuit having a first scale, wherein the first integrated circuit comprises a shrinkable circuit comprising a first intellectual property (IP) layout, and a non-shrinkable circuit comprising a second IP layout; and generating a second integrated circuit having a second scale smaller than the first scale. The step of generating the second integrated circuit includes shrinking the shrinkable integrated circuit to the second scale. The method further includes merging the second IP layout with the non-shrinkable circuit to generate a final integrated circuit.

In accordance with another aspect of the present invention, a method for processing an integrated circuit includes providing a first integrated circuit having a first scale, wherein the first integrated circuit comprises a shrinkable circuit and a non-shrinkable circuit represented by a first and a second intellectual property (IP) layout, respectively; generating a first phantom from the shrinkable circuit; generating a second phantom from the non-shrinkable circuit; blowing-up the second phantom by a first factor to generate a third phantom; placing and routing the first and the third phantoms to generate a top-level layout; shrinking the top-level layout by a second factor to generate a final top-level layout, wherein the second factor is substantially inverted from the first factor; shrinking the first IP layout by the second factor to generate a third IP layout having the second scale; and merging the second and the third IP layouts with the final top-level layout to generate a final integrated circuit.

In accordance with yet another aspect of the present invention, a production tool for processing an integrated circuit having a first scale, wherein the integrated circuit comprises a shrinkable circuit and a non-shrinkable circuit represented by a first and a second intellectual property (IP) layout, respectively. The production tool includes first computer program codes for generating a first phantom from the shrinkable circuit; second computer program codes for generating a second phantom from the non-shrinkable circuit; third computer program codes for blowing-up the second phantom by a first factor to generate a third phantom; fourth computer program codes for placing and routing the first and the third phantoms to generate a top-level layout; fifth computer program codes for shrinking the top-level layout by a second factor to generate a final top-level layout; sixth computer program codes for shrinking the first IP layout to generate a third IP layout having the second scale; and seventh computer program codes for merging the second and the third IP layouts with the final top-level layout to generate a final integrated circuit.

In the embodiments of the present invention, the IP layouts of the non-shrinkable integrated circuits are not shrunk. The adverse effects caused by the shrinking of the non-shrinkable integrated circuits, such as the change in sizes and locations of components, are thus reduced, and possibly eliminated.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

FIGS. 1 through 4 illustrate an embodiment of the present invention, in which integrated circuits designed using 45 nm scale is shrunk to 40 nm scale. It is noted that the 45 nm scale and 40 nm scale are merely examples, and the teaching of the present invention may be used for the shrinking of integrated circuits between any two technology generations.

Figure 1:
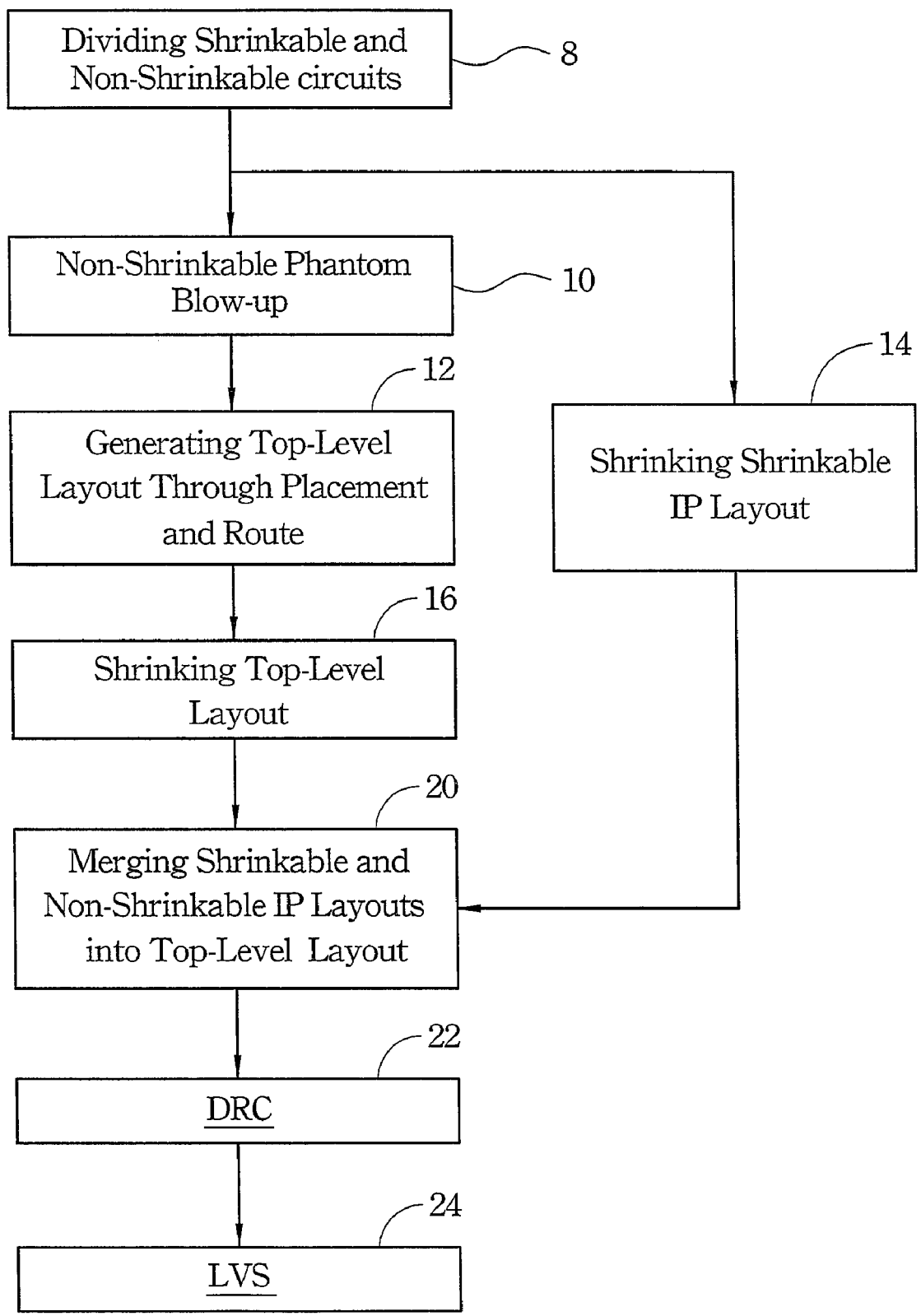
FIG. 1 illustrates a flow chart of an embodiment of the present invention.

FIG. 1 illustrates an exemplary flow chart. The steps recited in the flow chart are discussed in detail in the subsequent paragraphs. For simplicity, the embodiments of the present invention recites the scale of 10/9 as a blow-up scale for blowing-up layouts, and 0.9 as the shrinking scale for shrinking layouts from 45 nm technology to 40 nm technology. However, these scales are merely examples. One skilled in the art will be able to develop appropriate scales for the respective technology generations.

Figure 2:
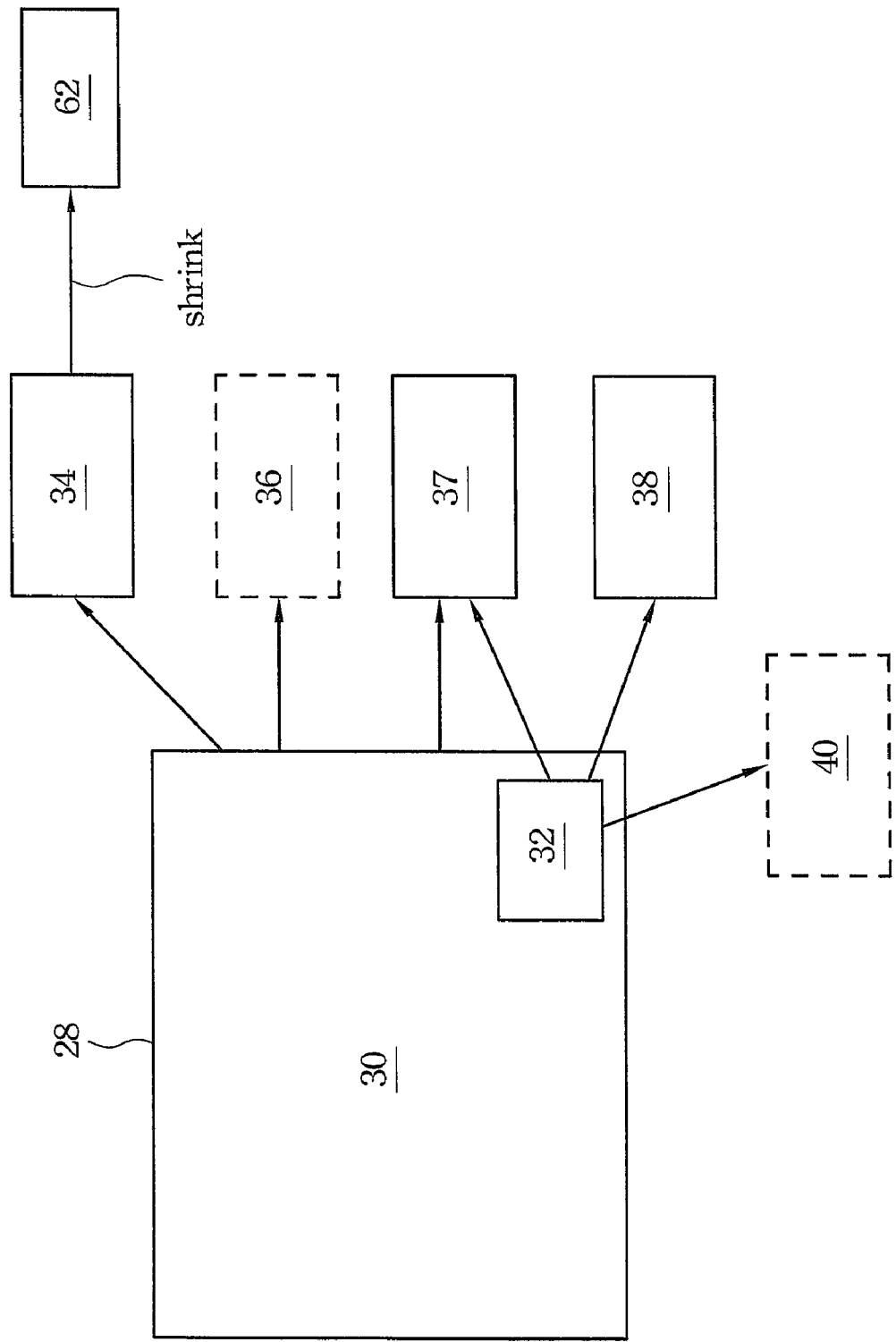
FIG. 2 schematically illustrates integrated circuits in a semiconductor chip, wherein the integrated circuits include shrinkable circuits and non-shrinkable circuits.

FIG. 2 schematically illustrates integrated circuits semiconductor chip 28, wherein the integrated circuits are at 45 nm scale. Semiconductor chip 28 includes a shrinkable integrated circuit 30 and a non-shrinkable integrated circuit 32, which are divided (Step 8 in FIG. 1), so that they can be processed separately in subsequent process steps. One semiconductor chip, however, may include a plurality of shrinkable integrated circuits and a plurality of non-shrinkable integrated circuits. The teaching regarding shrinkable integrated circuit 30 and non-shrinkable integrated circuit 32 is thus equally applicable to other shrinkable and non-shrinkable circuits. Throughout the description, the terms "semiconductor chip" and "integrated circuit" refer to the designs of the semiconductor chips and the integrated circuits, instead of physical semiconductor chips and physical integrated circuits.

The non-shrinkable integrated circuit 32 preferably includes analog circuits and/or high-speed digital circuits, or any other circuits that are considered inappropriate to be shrunk. Non-shrinkable integrated circuits are also alternatively referred to as legacy circuits or critical circuits. In an exemplary embodiment, the integrated circuits in semiconductor chip 28 are designed with a 5 nm grid, that is, the nodes and features are designed to overlap grid lines, which have distances of 5 nm between neighboring grid lines.

Each of the shrinkable integrated circuit 30 and non-shrinkable integrated circuit 32 includes layout details, also referred to as intellectual property (IP) layouts, which may be represented using graphic data system (GDS) files. Shrinkable integrated circuit 30 has IP layout 34. An abstract (also referred to as phantom) 36 is generated from the shrinkable integrated circuit 30. Preferably, a phantom includes the information of boundaries and pins of the respective IP layout, wherein the pins are used by routing tool to connect the phantom to other phantoms through wiring. In other words, a phantom is similar to an interface of the respective IP layout. The phantom may also be in the format of GDS files. Non-shrinkable integrated circuit 32 has IP layout 38. Phantom 40 is generated from the non-shrinkable integrated circuit 32. In addition, references 37, which preferably include the relationship between IP layouts and phantoms, for example, the ownership of phantoms by the corresponding IP layouts, are generated. References 37 may later be used to merge the IP layouts with the respective phantoms. For an easy identification, throughout the description, phantoms are illustrated as boxes with dashed lines.

Figure 3:
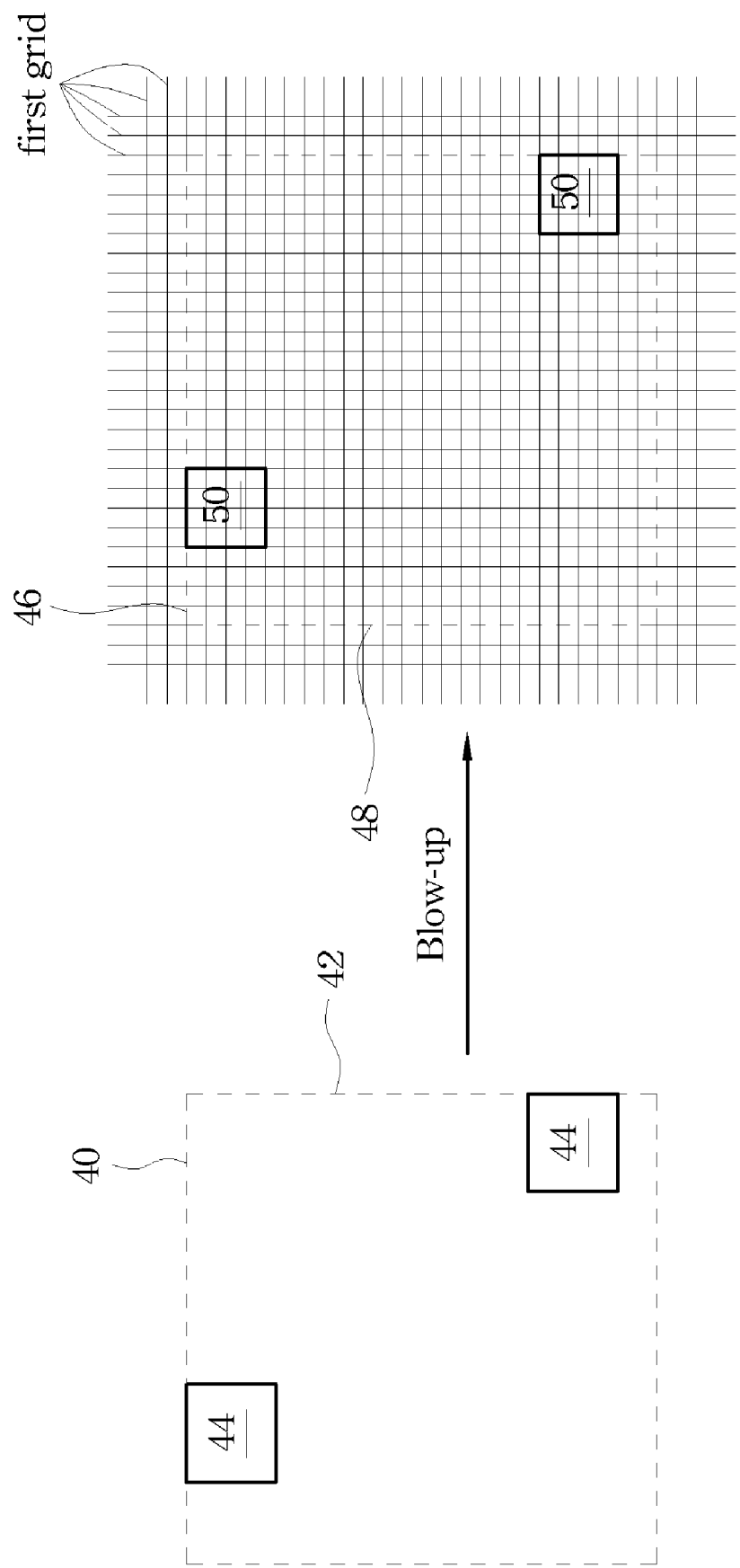
FIG. 3 illustrates the blow-up of a phantom of a non-shrinkable circuit.

FIG. 3 schematically illustrates the blow-up (magnifying) of phantom 40 of the non-shrinkable circuit 32, which is shown as step 10 in FIG. 1. In an exemplary embodiment, phantom 40 is blown-up to 10/9 of the original size, wherein 10/9 is referred to as a blow-up scale. Phantom 40 includes boundary 42 and pins 44. The magnified phantom is denoted as phantom 46, which includes boundary 48 and pins 50. The sizes of pins 50 are accordingly blown-up to about 10/9 of the sizes of the respective pins 44.

It is likely that pins 50 and boundary 48 are not exactly on the grid lines. Therefore, a snapping is performed to snap pins 50 and boundary 48 to 5 nm grid lines (denoted as a "first grid" in FIG. 3), which are the same as the grid lines of integrated circuits 30 and 32 as shown in FIG. 2. To avoid the shorting of wires between pins, pins 50 are preferably inner-snapped, meaning if the boundaries of pins 50 are not on 5 nm grid lines, the boundaries are shrunk to the nearest 5 nm grid line. In addition, the blockage regions (not shown), which are regions in metallization layers reserved for IP layouts (of integrated circuits in semiconductor chip 28), are also preferably inner-snapped. However, boundary 48 is preferably outer-snapped to the respective nearest 5 nm grid lines. Accordingly, boundary 48 may expand due to the snapping, while pins 50 and the blockage regions may shrink due to the snapping.

Figure 4:
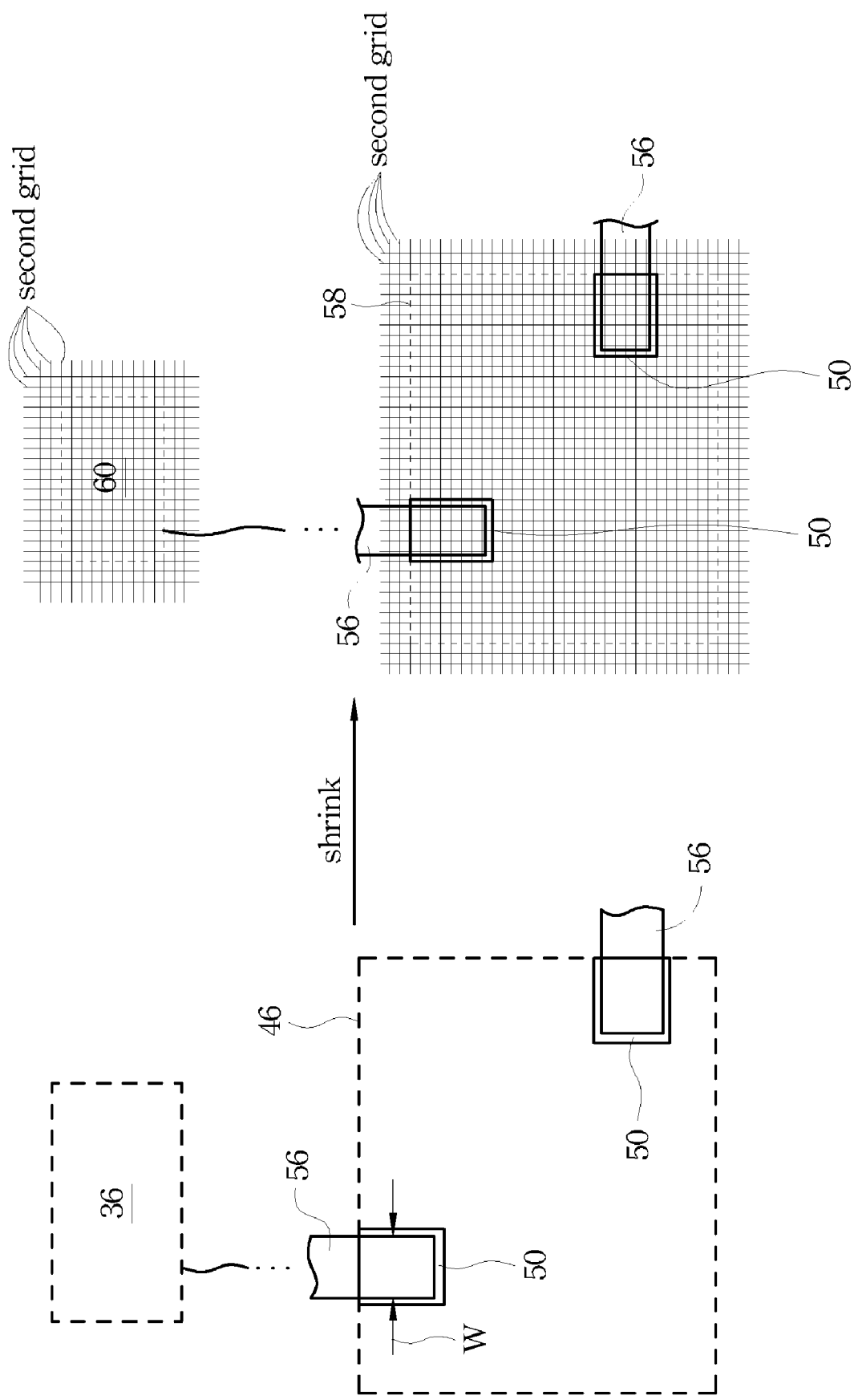
FIG. 4 illustrates the integration of the phantom of the non-shrinkable circuit with a phantom of the shrinkable circuit to form a top-level layout, and the shrinking of the top-level layout.

Next, as is shown in the left part of FIG. 4, placement and route (P & R) are performed to integrate phantom 36 of the shrinkable circuit 30 and the blown-up phantom 46 of the non-shrinkable circuit 32 (step 12 in FIG. 1), forming a top-level layout. Also, all other phantoms in the same semiconductor chip are integrated with phantoms 36 and 46. Wires 56 are placed and routed between the phantoms of the integrated circuits in order to connect the phantoms. It is noted that since the placement and route of wires are performed after the snapping (and possibly after the shrinking due to the snapping) of pins 50, wires 56 will have same width W with pins 50, although in FIG. 4, wires 56 and pins 50 are illustrated as having different widths for easy identification.

The top-level layout is then shrunk (step 16 in FIG. 1), generating a final top-level layout, which includes phantoms 58 and 60. Phantoms 58 and 60 are the shrunk version of phantoms 46 and 36, respectively. Pins 50 and wires 56 will also be shrunk in a same scale. In the preferred embodiment, the shrinking scale is exactly the inverted value (0.9) of the blown-up scale, which is 10/9 in the exemplary embodiment. Accordingly, the blow-up scale and the shrink scale have a product of 1, which means phantom 58 of the non-shrinkable circuit 32 has an exactly same size as phantom 36 (refer to FIG. 2), if the snapping of the boundary of 48 (refer to FIG. 3) is not considered. Phantom 60 of the shrinkable circuit 30, however, is smaller than the original size by the shrink scale, which is 0.9. The final top-level layout preferably has a 0.5 nm grid. Advantageously, since the product of 0.9 times 5 nm, which product is the expected grid of the top-level layout, is 4.5 nm, with the 0.5 nm grid (denoted as a "second grid" in FIG. 4"), no snapping is needed. If the shrinking is performed between different generations of technologies other than 45 nm and 40 nm technologies, the grid for phantoms 58 and 60 may be calculated accordingly to ensure that phantoms 58 and 60 and corresponding pins overlap the grid. Again, 5 nm and 0.5 nm are only exemplary grids, and different grids can be used.

Referring to step 14 in the flow chart shown in FIG. 1, the IP layout 34 of the shrinkable circuit 30 (FIG. 2) is shrunk by the shrink factor, generating a new IP layout 62 (also refer to FIG. 2).

Referring to step 20 in the flow chart shown in FIG. 1, IP layouts 38 and 62 (refer to FIG. 2) are merged with the post-shrunk phantoms 58 and 60 (refer to FIG. 4), respectively, so that both the boundaries and the details of integrated circuits are integrated. Since IP layout 38 is obtained from the original circuit having 45 nm, it fits into phantom 58. This is because phantom 58 is likely to be of exactly the same size of phantom 36, or slightly bigger due to the snapping during the blow-up. IP layout 62 is shrunk in a same shrink scale as the respective phantom 60, and thus will also fit. References 37 (refer to FIG. 2) are used to identify each phantom and the corresponding owning IP layout.

After the steps discussed in the preceding paragraphs, a final integrated circuit with a 40 nm scale is formed. Desirably, in the final integrated circuit, the shrinkable integrated circuit 30 is shrunk, while the non-shrinkable integrated circuit 32 is not shrunk. A design rule check (DRC, step 22 in FIG. 1) may thus be performed to ensure that the final integrated circuit follows all design rules.

A layout-verse-schema comparison (LVS) check is then performed (step 24 in FIG. 1). The LVS check may compare the final integrated circuit to the original design specifications, for example, whether the connecting wires are all connected between the desired components, and the like. The LVS check ensures that the circuits manipulated by the steps discussed in the preceding paragraphs fully match the original design. The LVS check may be performed using SPICE.

In the flow chart shown in FIG. 1, the steps 10 through 24 as illustrated in the flow chart may each be performed by a computer program (program codes), for example, a script, which may be run by designers to generate an integrated circuit design. The resulting integrated circuits have already shrunk to the desired scale, and hence foundries do not need to perform the shrinking process.

The embodiments of the present invention have several advantageous features. Since the original IP layout 38 (FIG. 2) is used in the size of the original IP layout 38 final integrated circuit without going through blow-up and shrink processes, the likely change in size due to the snapping is eliminated. This guarantees the non-shrinkable circuit will have the exact same performance throughout different technology generations. On the other hand, the shrinkable integrated circuits are shrunk and take advantage of reduced chip area usage. Furthermore, without the need to manipulate IP layout 38, the hierarchical structure of the respective GDS files does not need to be flattened. The GDS files thus can keep the original size, and hence the respective handling time is not increased. In addition, by carefully handling the phantom blown-up procedure with appropriate grids, the device performance drift and mismatching is reduced, and possibly eliminated.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing an integrated circuit, the method comprising:

providing a first integrated circuit representation having a first circuit layout scale, wherein the first integrated circuit representation comprises a shrinkable circuit comprising a first intellectual property (IP) layout, and a non-shrinkable circuit comprising a second IP layout;

generating a second integrated circuit representation having a second circuit layout scale smaller than the first circuit layout scale, wherein the step of generating the second integrated circuit representation comprises:

shrinking the shrinkable circuit to the second circuit layout scale, wherein the step of shrinking the shrinkable circuit comprises:

generating a first phantom from the shrinkable circuit;

shrinking the first IP layout to generate a third IP layout having the second circuit layout scale; and merging the third IP layout with a final top layout under the second circuit layout scale;

merging the second IP layout with the shrinkable circuit of the second circuit layout scale to generate a final integrated circuit representation wherein the step of merging the second IP layout comprises:

generating a second phantom from the non-shrinkable circuit;

blowing-up the second phantom to generate a third phantom;

placing and routing the first and the third phantoms to generate a top-level layout;

shrinking the top-level layout to the second circuit layout scale to generate a final top-level layout; and merging the second IP layout with the final top-level layout; and implementing the final integrated circuit representation on a chip.

2. The method of claim 1, wherein the step of blowing-up the second phantom comprises inner-snapping pins in the third phantom to a first grid.

3. The method of claim 2, wherein the final top-level layout has a second grid smaller than the first grid, and wherein features in the final top-level layout overlap the second grid without snapping.

4. The method of claim 1, wherein the step of blowing-up the second phantom comprises outer-snapping a boundary of the third phantom to a first grid.

5. The method of claim 1 further comprising a design rule check against the final integrated circuit representation.

6. A method for processing an integrated circuit, the method comprising:
   providing a first integrated circuit representation having a first circuit layout scale, wherein the first integrated circuit representation comprises a shrinkable circuit and a non-shrinkable circuit represented by a first and a second intellectual property (IP) layout, respectively;
   generating a first phantom from the shrinkable circuit;
   generating a second phantom from the non-shrinkable circuit;
   blowing-up the second phantom by a first factor to generate a third phantom;
   placing and routing the first and the third phantoms to generate a top-level layout;
   shrinking the top-level layout by a second factor to generate a final top-level layout, wherein the second factor is substantially inverted from the first factor;
   shrinking the first IP layout by the second factor to generate a third IP layout having a second circuit layout scale;
   merging the second and the third IP layouts with the final top-level layout to generate a final integrated circuit representation; and
   implementing the final integrated circuit representation on a chip.

7. The method of claim 6, wherein the step of blowing-up the second phantom comprises inner-snapping pins in the third phantom to a first grid.

8. The method of claim 7, wherein blowing-up the second phantom comprises outer-snapping a boundary of the third phantom to the first grid.

9. The method of claim 7, wherein the final top-level layout has a second grid smaller than the first grid.

10. The method of claim 6 further comprising a design rule check against the final integrated circuit representation.

11. The method of claim 6 further comprising a layout-verses-schema (LSV) comparison check.

12. A production tool for processing an integrated circuit, wherein the integrated circuit has a first circuit layout scale, and wherein the integrated circuit comprises a shrinkable circuit and a non-shrinkable circuit represented by a first and a second intellectual property (IP) layout, respectively, the production tool comprising:
   first computer program codes for generating a first phantom from the shrinkable circuit;
   second computer program codes for generating a second phantom from the non-shrinkable circuit;
   third computer program codes for blowing-up the second phantom by a first factor to generate a third phantom;
   fourth computer program codes for placing and routing the first and the third phantoms to generate a top-level layout;
   fifth computer program codes for shrinking the top-level layout by a second factor to generate a final top-level layout;
   sixth computer program codes for shrinking the first IP layout to generate a third IP layout having a second circuit layout scale; and
   seventh computer program codes for merging the second and the third IP layouts with the final top-level layout to generate a final integrated circuit representation.

13. The production tool of claim 12, wherein the second factor has a substantially inverted value of the first factor, and wherein the first IP layout is shrink by the second factor.

14. The production tool of claim 12, wherein the third computer program codes for blowing-up the second phantom further comprise additional program codes for inner-snapping pins in the third phantom to a first grid.

15. The production tool of claim 14, wherein the third computer program codes for blowing-up the third phantom further comprise program codes for outer-snapping a boundary of the third phantom to the first grid.

16. The production tool of claim 14, wherein the final top-level layout has a second grid smaller than the first grid.

17. The production tool of claim 12 further comprising computer program codes for checking design rules against the final integrated circuit representation.

* * * * *

UNITED STATES PATENT AND TRADEMARK OFFICE
CERTIFICATE OF CORRECTION

| | |
|---|---|
| PATENT NO. | : 7,640,520 B2 |
| APPLICATION NO. | : 11/807640 |
| DATED | : December 29, 2009 |
| INVENTOR(S) | : Wang et al. |

It is certified that error appears in the above-identified patent and that said Letters Patent is hereby corrected as shown below:

In Col. 8, line 29, delete "shrink" and insert --shrunk--.

Signed and Sealed this

Second Day of February, 2010

David J. Kappos
*Director of the United States Patent and Trademark Office*